(No Model.)
R. A. RAY.
PLOW OR CULTIVATOR.
No. 575,169. Patented Jan. 12, 1897.
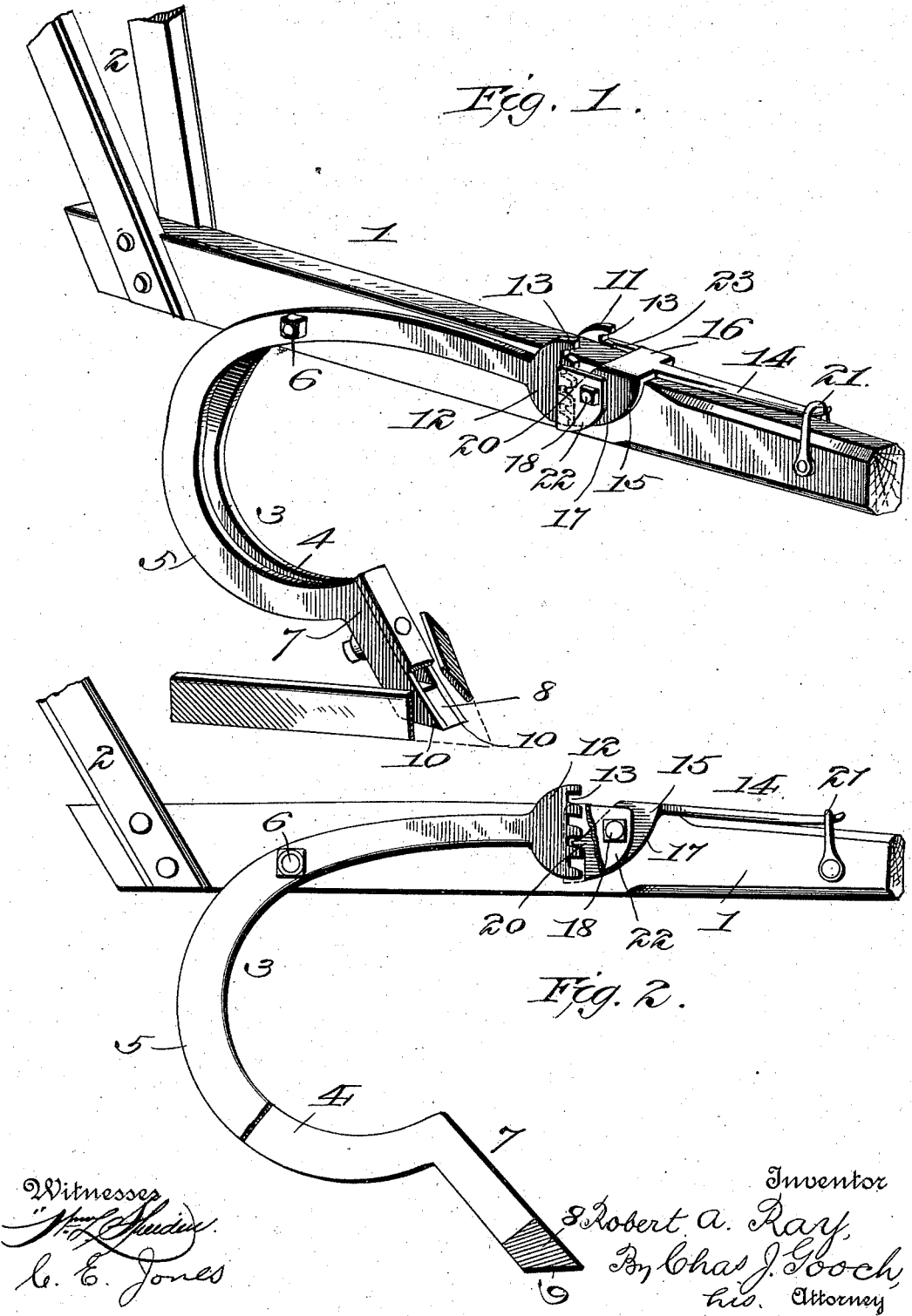

UNITED STATES PATENT OFFICE.

ROBERT A. RAY, OF TALKING ROCK, GEORGIA, ASSIGNOR OF ONE-HALF TO JAMES L. KEEL, OF SAME PLACE.

PLOW OR CULTIVATOR.

SPECIFICATION forming part of Letters Patent No. 575,169, dated January 12, 1897.

Application filed May 9, 1896. Serial No. 590,890. (No model.)

*To all whom it may concern:*

Be it known that I, ROBERT A. RAY, a citizen of the United States, residing at Talking Rock, in the county of Pickens and State of Georgia, have invented certain new and useful Improvements in Plows or Cultivators; and I do hereby declare the following to be a full, clear, and exact description of the invention, such as will enable others skilled in the art to which it appertains to make and use the same.

This invention relates to improvements, as hereinafter set forth, in plows or cultivators.

My invention is applicable to plows and cultivators, generally turners and the like, and having either single or double feet.

In the drawings, Figure 1 represents a perspective view of so much of a plow as is necessary to illustrate my invention provided with a double foot. Fig. 2 represents a side elevation thereof.

1 represents the ordinary draft-beam, and 2 represents the handles.

In the drawings I have shown the foot 3 in double form, though it will be apparent that my improvements are equally well applicable to plows or cultivators and the like where the feet or shares are formed of a single piece of metal. In the foot shown it is composed of a pair of bars 4 5 of substantially C shape, straddling the beam and pivoted on the sides thereof by a bolt 6. From the lower portion of each of these bars 4 5 extends forwardly, at an obtuse angle, a crook or point 7, the respective outer ends of which crooks or points being joined and closed by a block 8, having a beveled bottom bearing-face 9, corresponding with the beveled bottom edges 10 of the respective crooks or points 7. The front upper ends of the respective bars 4 5 are provided with segments 11 12, each having in its forward edge a series of teeth 13, extending vertically.

14 represents a lever extending normally along the top of the beam 1 and having at its rear a broad forked extension 15, extending at 16 across the top of the beam 1 and depending, in the form of ears 17, on each side of said beam. 18 represents a bolt passed transversely through the beam and through said ears 17 to pivot said ears and lever to said beam. 20 represents a pair of dogs formed on the lower rear edge of the respective ears 17 to engage with the respective series of teeth 13 as the C-shaped bars 4 5 and crooks or points 7 are adjusted to hold the same in adjusted position. 21 represents a pivoted link keeper for locking said lever on the top of the beam 1. 22 23 represent a pair of plates mounted on the pivot-bolt 18 outside of the ears 17 and projecting rearwardly of said ears to impinge against and grasp the sides of the segments and serve as keepers therefor.

The operation will be readily apparent. When it is desired to adjust the angular position of the point or crook 7, the link keeper 21 is released from engagement with the lever 14. Said lever is then raised to release the dogs 20 from engagement with the teeth 13. The combined side bars 4 5 and points or crooks 7 are then turned on their pivot-bolt 6 until the desired angular position of said points or crooks is attained, whereupon said lever is then drawn down so as to again bring the dogs 20 into engagement with the teeth 13, and thereby lock said side bars and crooks in adjusted position. The lever is then locked by turning the link keeper 21 over on said lever.

It will be manifest to those skilled in the art that the side bar and foot or point locking arrangement described is equally applicable to those cases where a single bar, as 4 or 5, and a single obtuse-angled crook or point, as 7, alone is employed; also, that a single bar, as 4 or 5, having either a solid C portion and secured to one side only of the beam 1 by pivot connection may be employed, or said side bar and point or crook may be solid throughout, except at the upper portion of the side bar, where it may be bifurcated, so as to straddle the draft-beam. Where a single-armed side bar is employed, it would be pivoted to one side only of the draft-beam, and in that case, while the exact construction of locking device shown might also be used, the rearward extension of the lever need only be provided with a single dog to engage with the teeth carried by the segment.

My improvements are adaptable for connection with plow and cultivator beams of ordinary construction. By forming the crook or point 7 as shown and described all clogging of the foot is avoided, and in connection of that formation and the special formation of the side bars shown the trash and dirt will not bind or clog, but will escape behind, resulting in an easy and clear movement at all times and the avoidance of stoppages and difficult draft in the most trashy ground.

Having thus described my invention, what I claim is—

1. A plow consisting of a draft-beam, a rearwardly-curved standard pivoted on said beam and having at its lower end an obtuse-angled crook and at its upper and front end a vertical series of teeth, a horizontal lever pivoted on said beam and having at its rear a dog to engage said teeth and a pair of beam and standard gripping keepers, and a lever-clasp pivoted on said beam, substantially as and for the purpose set forth.

2. A plow consisting of a draft-beam, a two-part or bifurcated rearwardly-bowed standard straddling and pivoted to said beam and having at its upper, front, end a pair of toothed segments, a crook extending at an obtuse angle from the bottom of said standard and having a beveled bottom edge, a lever having a bifurcated and eared rear extension pivoted on said beam, a pair of dogs on the bifurcated rear portion of the lever, a pair of rearwardly-extending standard-gripping plates carried by said lever-pivot, and a link lever-keeper pivoted on said beam, substantially as and for the purpose set forth.

In testimony whereof I affix my signature in presence of two witnesses.

ROBERT A. RAY.

Witnesses:
   ISAAC GRANT,
   C. J. CORNELISON.